United States Patent
Yuen et al.

(10) Patent No.: US 8,689,259 B2
(45) Date of Patent: Apr. 1, 2014

(54) HOME ENTERTAINMENT SYSTEM AND METHOD OF ITS OPERATION

(75) Inventors: Henry C. Yuen, Pasadena, CA (US); Thomas E. Ward, Weston, MA (US); Eric Shalkey, Methuen, MA (US); P. Christopher Shoaff, Westford, MA (US)

(73) Assignee: Index Systems, Inc., Tortola (VG)

( * ) Notice: Subject to any disclaimer, the term of this patent is extended or adjusted under 35 U.S.C. 154(b) by 1102 days.

(21) Appl. No.: 10/963,764

(22) Filed: Oct. 12, 2004

(65) Prior Publication Data

US 2005/0198668 A1    Sep. 8, 2005

Related U.S. Application Data (63) Continuation of application No. 09/355,860, filed as application No. PCT/US99/01425 on Jan. 23, 1999, now abandoned.

(60) Provisional application No. 60/072,396, filed on Jan. 23, 1998.

(51) Int. Cl.
    *H04N 7/10*      (2006.01)
    *H04N 7/025*     (2006.01)
    *G06F 3/00*      (2006.01)
    *G06F 13/00*     (2006.01)
    *H04N 5/445*     (2011.01)

(52) U.S. Cl.
    USPC .................... 725/42; 725/36; 725/58; 725/61

(58) Field of Classification Search
    USPC ...................................... 725/47, 61
    See application file for complete search history.

(56) References Cited

U.S. PATENT DOCUMENTS

| | | |
|---|---|---|
| 4,704,725 A | 11/1987 | Harvey et al. |
| 4,977,455 A | 12/1990 | Young |
| 5,093,921 A | 3/1992 | Bevins, Jr. |
| 5,155,591 A | 10/1992 | Wachob |
| 5,216,515 A | 6/1993 | Steele et al. |
| 5,233,654 A | 8/1993 | Harvey et al. |
| 5,353,121 A | 10/1994 | Young et al. |

(Continued)

FOREIGN PATENT DOCUMENTS

| | | |
|---|---|---|
| EP | 0 424 648 | 5/1991 |
| EP | 0682452 A2 | 11/1995 |

(Continued)

*Primary Examiner* — Ricky Chin
(74) *Attorney, Agent, or Firm* — Ropes & Gray LLP (57) ABSTRACT

An EPG database for a home entertainment system includes files that contain information about television programs retrievable by time and channel. The files are linked to each other so information about a future television program can be obtained by accessing a file about a current television program. A current television program displayed on the screen of a home entertainment system includes an announcement or advertisement of a future television program. The availability of an electronic program guide function (e.g., record, watch, details, display time, display channel, display by theme, and Internet connection) is signaled during, before, or after the announcement. A command is issued to invoke the EPG function. The information about the future television program is retrieved from the file about the current television program in the database. The EPG function is executed with the retrieved information. As a result, an EPG function can be performed with respect to a future television program without embedding information about the future television program in the television signal.

40 Claims, 3 Drawing Sheets

(56) References Cited

U.S. PATENT DOCUMENTS

| | | | |
|---|---|---|---|
| 5,446,919 A | 8/1995 | Wilkins | |
| 5,515,098 A | 5/1996 | Carles | |
| 5,523,796 A | 6/1996 | Marshall et al. | |
| 5,532,735 A | 7/1996 | Blahut et al. | |
| 5,553,221 A | 9/1996 | Reimer et al. | |
| 5,559,548 A | 9/1996 | Davis et al. | |
| 5,585,838 A | 12/1996 | Lawler et al. | |
| 5,589,892 A | 12/1996 | Knee et al. | |
| 5,600,364 A | 2/1997 | Hendricks et al. | |
| 5,600,573 A | 2/1997 | Hendricks et al. | |
| 5,602,597 A | 2/1997 | Bertram | |
| 5,617,565 A | 4/1997 | Augenbraun et al. | |
| 5,623,613 A | 4/1997 | Rowe et al. | |
| 5,659,350 A | 8/1997 | Hendricks et al. | |
| 5,659,653 A * | 8/1997 | Diehl et al. | 386/248 |
| 5,661,516 A | 8/1997 | Carles | |
| 5,682,511 A | 10/1997 | Sposato et al. | |
| 5,699,107 A * | 12/1997 | Lawler et al. | 725/58 |
| 5,731,844 A | 3/1998 | Rauch et al. | |
| 5,740,549 A | 4/1998 | Reilly et al. | |
| 5,774,170 A | 6/1998 | Hite et al. | |
| 5,809,204 A | 9/1998 | Young et al. | |
| 5,828,402 A | 10/1998 | Collings | |
| 5,850,218 A | 12/1998 | LaJoie et al. | |
| 5,880,768 A | 3/1999 | Lemmons et al. | |
| 5,940,073 A | 8/1999 | Klosterman et al. | |
| 5,986,650 A * | 11/1999 | Ellis et al. | 725/40 |
| 6,002,393 A | 12/1999 | Hite et al. | |
| 6,002,394 A * | 12/1999 | Schein et al. | 725/39 |
| 6,005,565 A | 12/1999 | Legall et al. | |
| 6,008,802 A | 12/1999 | Iki et al. | |
| 6,011,546 A | 1/2000 | Bertram | |
| 6,061,097 A | 5/2000 | Satterfield | |
| 6,111,614 A | 8/2000 | Mugura et al. | |
| 6,133,909 A | 10/2000 | Schein et al. | |
| 6,147,715 A | 11/2000 | Yuen et al. | |
| 6,169,542 B1 | 1/2001 | Hooks et al. | |
| 6,177,931 B1 | 1/2001 | Alexander et al. | |
| 6,202,212 B1 | 3/2001 | Sturgeon et al. | |
| 6,219,839 B1 | 4/2001 | Sampsell | |
| 6,247,176 B1 | 6/2001 | Schein et al. | |
| 6,256,071 B1 | 7/2001 | Hiroi | |
| 6,263,501 B1 | 7/2001 | Schein et al. | |
| 6,275,268 B1 | 8/2001 | Ellis et al. | |
| 6,282,713 B1 | 8/2001 | Kitsukawa et al. | |
| 6,289,346 B1 | 9/2001 | Milewski et al. | |
| 6,342,926 B1 * | 1/2002 | Hanafee et al. | 348/563 |
| 6,412,111 B1 * | 6/2002 | Cato | 725/137 |
| 6,542,882 B1 | 4/2003 | Smith | |
| 6,571,390 B1 | 5/2003 | Dunn et al. | |
| 6,665,869 B1 | 12/2003 | Ellis et al. | |
| 6,757,906 B1 | 6/2004 | Look et al. | |
| 6,772,433 B1 * | 8/2004 | LaJoie et al. | 725/52 |
| 7,152,236 B1 | 12/2006 | Wugofski et al. | |
| 7,663,700 B2 | 2/2010 | Yuen et al. | |
| 8,082,568 B2 | 12/2011 | Ellis et al. | |
| 2001/0042246 A1 | 11/2001 | Yuen et al. | |
| 2002/0013950 A1 | 1/2002 | Tomsen | |
| 2002/0042913 A1 | 4/2002 | Ellis et al. | |
| 2003/0149980 A1 | 8/2003 | Ellis et al. | |
| 2003/0159150 A1 * | 8/2003 | Chernock et al. | 725/58 |
| 2004/0103439 A1 | 5/2004 | Macrae et al. | |
| 2004/0128685 A1 | 7/2004 | Hassell et al. | |

FOREIGN PATENT DOCUMENTS

| | | |
|---|---|---|
| EP | 0735749 A2 | 10/1996 |
| EP | 0 848 554 A2 | 6/1998 |
| EP | 0 854 645 A2 | 7/1998 |
| JP | 9-027936 | 1/1997 |
| JP | 09-162821 | 6/1997 |
| JP | 09-037233 | 7/1997 |
| JP | 09-289498 | 11/1997 |
| WO | WO 95/07003 | 3/1995 |
| WO | WO 95/32585 | 11/1995 |
| WO | WO 96/07270 | 3/1996 |
| WO | WO 96/09721 | 3/1996 |
| WO | WO 96-34491 | 10/1996 |
| WO | WO-96/37996 | 11/1996 |
| WO | WO 97/13368 | 4/1997 |
| WO | WO 97/18675 | 5/1997 |
| WO | WO 97/19555 | 5/1997 |
| WO | WO 97/31480 | 8/1997 |
| WO | WO 97/42763 | 11/1997 |
| WO | WO-9741690 A1 | 11/1997 |
| WO | WO 97/49241 | 12/1997 |
| WO | WO 97/49242 | 12/1997 |
| WO | WO 97/50251 | 12/1997 |
| WO | WO 98/17064 | 4/1998 |
| WO | WO 98/26584 | 6/1998 |
| WO | WO 98/27723 | 6/1998 |
| WO | WO 99/04561 | 1/1999 |
| WO | WO 00/38428 | 6/2000 |
| WO | WO 01/15438 | 3/2001 |

* cited by examiner

HOME ENTERTAINMENT SYSTEM AND METHOD OF ITS OPERATION

CROSS-REFERENCE TO RELATED APPLICATIONS

This application is a continuation of U.S. Non-Provisional application Ser. No. 09/355,860, filed on Aug. 4, 1999 and now abandoned, which is a U.S. National Stage Entry Application of PCT Patent Application No. PCT/US99/01425 filed on Jan. 23, 1999, which claims priority to and benefits of U.S. Provisional Application No. 60/072396, filed on Jan. 23, 1998, the entirety of each of these applications is incorporated herein by reference.

This application claims priority of provisional application Ser. No. 60/072,396, filed on Jan. 23, 1998, the disclosure of which is incorporated fully herein by reference.

The disclosures of the following patent applications are also incorporated fully herein by reference: published International Application WO96/07270 published Mar. 7, 1996; U.S. Application No. 60/053,330 filed Jul. 21, 1997; U.S. Application No. 60/061,119 filed Oct. 6, 1997; U.S. Application No. 60/055,237 filed Aug. 12, 1997, and U.S. application Ser. No. 09/120,488 filed Jul. 21, 1998.

BACKGROUND OF THE INVENTION

This invention relates to a home entertainment system and a method for its operation and, more particularly, to facilitation of electronic program guide (EPG) functions with respect to the promotion of future television programs in a home entertainment system.

U.S. Pat. No. 4,977,455 which issued on Dec. 11, 1990 discloses a system and process for supplying supplemental information after a user responds to a cue. The cue is provided during a broadcast to indicate the availability of the supplemental information relating to the broadcast. The supplemental information is preferably sent at a later time, although schedule information for the supplemental information is sent with the broadcast. After the user responds to the cue, the schedule information is first stored and is then used to record the supplemental information. In one embodiment, supplemental data is sent in the VBI of the video signal.

SUMMARY OF THE INVENTION

According to one aspect of the invention, a current television program displayed on the screen of a home entertainment system includes an announcement or advertisement of a future television program. The availability of an electronic program guide function is signaled during, before, or after the announcement. A command is issued to invoke the EPG function. An EPG database for the home entertainment system includes files that contain information about television programs retrievable by time and channel. The files are linked to each other so information about a future television program can be obtained by accessing a file about a current television program. The information about the future television program is retrieved from the file about the current television program in the database. The EPG function is executed with the retrieved information. As a result, an EPG function can be performed with respect to a future television program without embedding information about the future television program in the television signal.

The invention can be used to perform various EPG functions, including, without limitation, record, watch, details, display time, display channel, display by theme, and Internet connection.

According to an optional feature of the invention, a menu of choices is displayed in response to a command after display of an icon signaling the availability of an EPG function during, before or after the announcement.

According to another optional feature of the invention, a plurality of icons are displayed on the screen to signal different EPG functions, which can be invoked by selecting the corresponding icon.

BRIEF DESCRIPTION OF THE DRAWINGS

The features of specific embodiments of the best mode contemplated of carrying out the invention are illustrated in the drawings, in which.

DETAILED DESCRIPTION OF SPECIFIC EMBODIMENTS

In a specific embodiment of the invention, an icon is displayed on a television screen during a telecast of an announcement or advertisement of a later telecast program or some other type of visual or audio signal alerts the viewer that an electronic program guide (EPG) function can be performed without actually entering the EPG or at least not entering the EPG from the beginning.

For example, if the viewer wants to record on a VCR the program being advertised, the viewer issues an appropriate command from a remote controller, e.g., clicks on the icon with the select or enter key of the remote, and the time and channel of the advertised program are stored in the recording stack memory of the VCR. Preferably, a message is displayed momentarily in a box on the screen to confirm that the function will be performed. If desired a query could also be displayed whether the program should be displayed once or on more occasions, e.g., daily or weekly.

Or, for example, if the viewer wants to see more details about the advertised program, the viewer clicks on the icon and the details are retrieved from the RAM in which the EPG data is stored and either replace the advertisement on the screen or are displayed in an on-screen box. Alternatively, the advertisement could be displayed in a PIP window in accordance with the referenced PCT application.

Or, for example, if the viewer wishes to see what other programs are being telecast at the same time, on the same channel, or with the same theme as the advertised program, the viewer clicks on the icon and the EPG is displayed for the same day and time, the same channel, or the same theme as the advertised program.

If more than one function is available to the viewer, the choice of functions is first displayed in a menu when the viewer clicks on the icon and the function is executed when the viewer thereafter clicks on one of the displayed choices.

Figure 1:
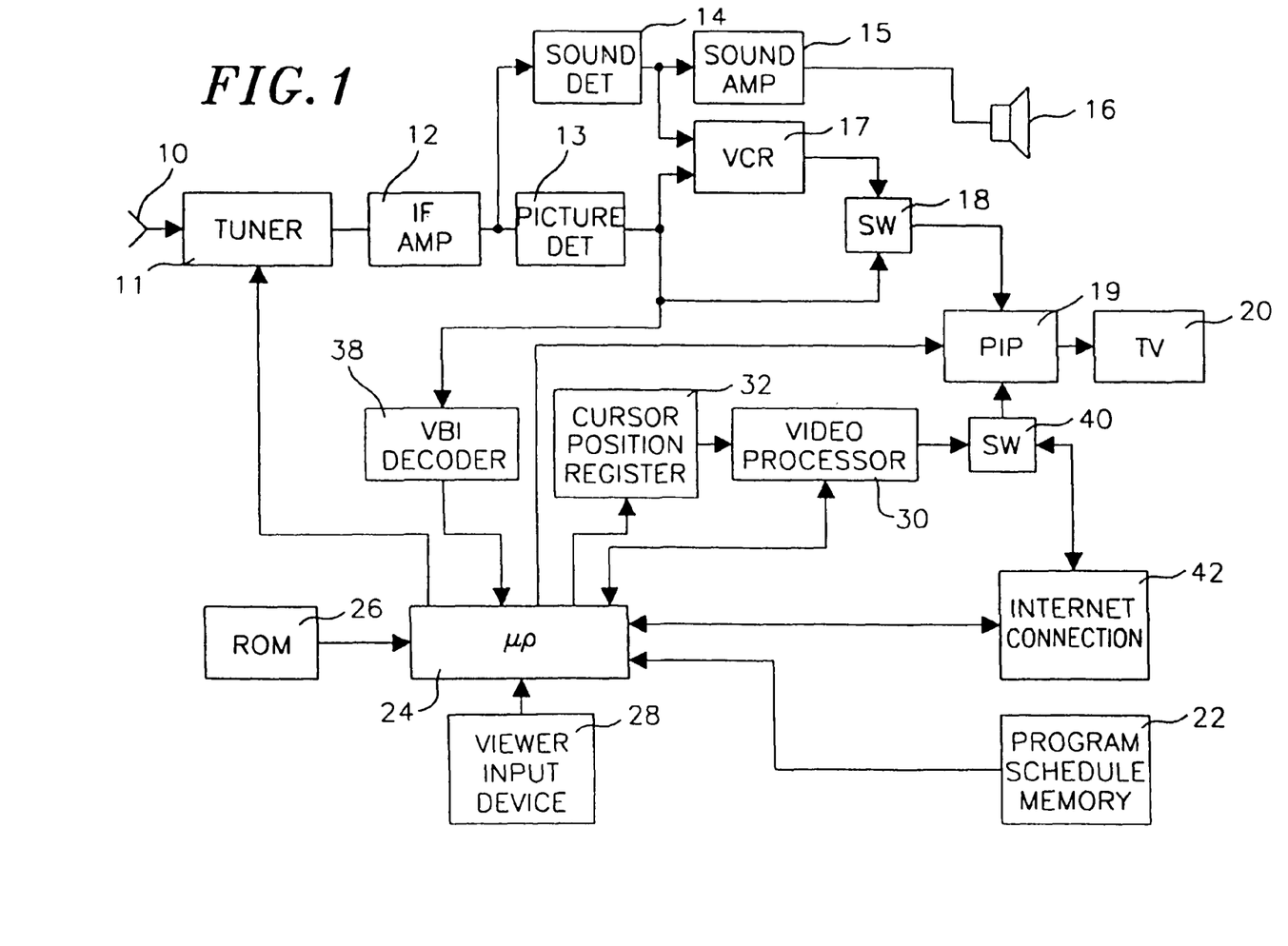
FIG. 1 is a schematic block diagram of a home entertainment system incorporating principals of the invention.

A home entertainment system is shown in FIG. 1. A source of television signals 10 such as a terrestrial antenna, or a cable is connected to a television tuner 11. The output of tuner 11 is a modulated intermediate frequency signal containing video and audio television information.

Tuner 11 is connected by an intermediate frequency amplifier (IF AMP) 12 to a picture detector (PICTURE DET) 13 and a sound detector (SOUND DET) 14, which produce base band video and audio signals, respectively. The audio signal is coupled by a sound amplifier (SOUND AMP) 15 to a loudspeaker 16. The video signal is coupled by a video amplifier not shown to one input of a switch 18. Sound detector 14 and picture detector 13 are connected to the audio and video inputs, respectively, of a video cassette recorder (VCR) 17. (Alternatively, television signal source 10 could be directly connected to the RF input of VCR 17 in well known fashion, if its internal tuner and demodulating circuitry are to be utilized.) The output of VCR 17 is connected to the other input of switch 18. The output of switch 18 is connected to one input of a conventional picture-in-picture (PIP) integrated circuit chip 19. The output of PIP chip 19 is connected to the video input of a television receiver or display monitor (TV) 20 having a screen (not shown).

An updatable data base of the schedule of program listings of all the available channels for a prescribed period of time, e.g., a day or a week, is electronically stored in a program schedule memory 22, preferably a RAM. Memory 22 is connected to a microprocessor 24 that is configured, i.e., programmed, to control the operation of the described equipment. An operating program for microprocessor 24 is stored in a read only memory (ROM) 26. These program listings typically include for each program the title, a program description (detail), the day of the week, the start time of the day, the program length, and the channel on which the program is transmitted and thus available for reception at source 10. These program listings are retrievable by time and channel. Further, to implement the invention these program listings are organized into files; the files are linked to each other so information about a future television program that is advertised in an earlier television program can be obtained by accessing a file about the earlier television program. The data base can be updated by a data transmission link in the vertical blanking interval (VBI) of a television channel broadcast to the television receiver in well known fashion. A VBI decoder 38 is connected between PICTURE DET 13 and microprocessor 24 for this purpose. Alternatively, the data base can be updated by unplugging memory 22 and replacing it with a memory having the updated data base or by another data transmission link such as an Internet connection or a pager in the 900 MHz band. A viewer input device 28, preferably in the form of a remote IR controller, is coupled to microprocessor 24 to issue commands from the viewer. A video processor 30 is coupled to microprocessor 24. When the viewer wishes to see television program listings, microprocessor 24 recalls a portion of the program schedule data base from memory 22 and couples it to video processor 30, where the program listings are formatted for display. Preferably, the information stored in video processor 30 is a bit map of what is displayed on the screen of television receiver 20. Video processor 30 is connected through a switch 40 to the other input of PIP chip 19. Preferably, viewer input device 28 controls microprocessor 24 by cursor movement on the screen of television receiver 20. To this end, microprocessor 24 and video processor 30 are coupled to a cursor position register 32. (Alternatively, the viewer can select items of information displayed on the screen by keying into viewer input device 28 code numbers assigned to these items.) Microprocessor 24 is also coupled to tuner 11 for channel change, to VCR 17 for play/record selection and start/stop, to switches 18 and 40 for selection of one of their inputs, and to PIP chip 19 for selection of the mode of PIP operation. An Internet connection 42 through a telephone line or bidirectional cable is controlled by microprocessor 24. Microprocessor 24 retrieves the address of the web site to which the viewer wants to connect. Internet connection 42 has the components required for implementing Web TV. The informatioin recovered from the addressed web site is coupled from Internet connection 42 through switch 40 to the one input of PIP chip 19 for display on the screen of TV 20.

In operation, tuner 11 is set to a viewer selected channel by microprocessor 24 responsive to input device 28. During a commercial break in the television program on the selected channel, an announcement or advertisement for another television program to be telecast at a later time is displayed on the screen of TV 20. Transmitted as part of the image of the advertisement is an icon that signals to the viewer that it is possible to link to an EPG function. Alternatively, the icon could be transmitted in the VBI during the advertisement, recovered by VBI decoder 38, transformed into graphic form in video processor 30, and overlayed on the image of the advertisement. (If desired the icon could be displayed immediately before or immediately after the advertisement.) The advertisement designated 50 and an icon 52 are illustrated in FIG. 2.

Figures 2, 3:
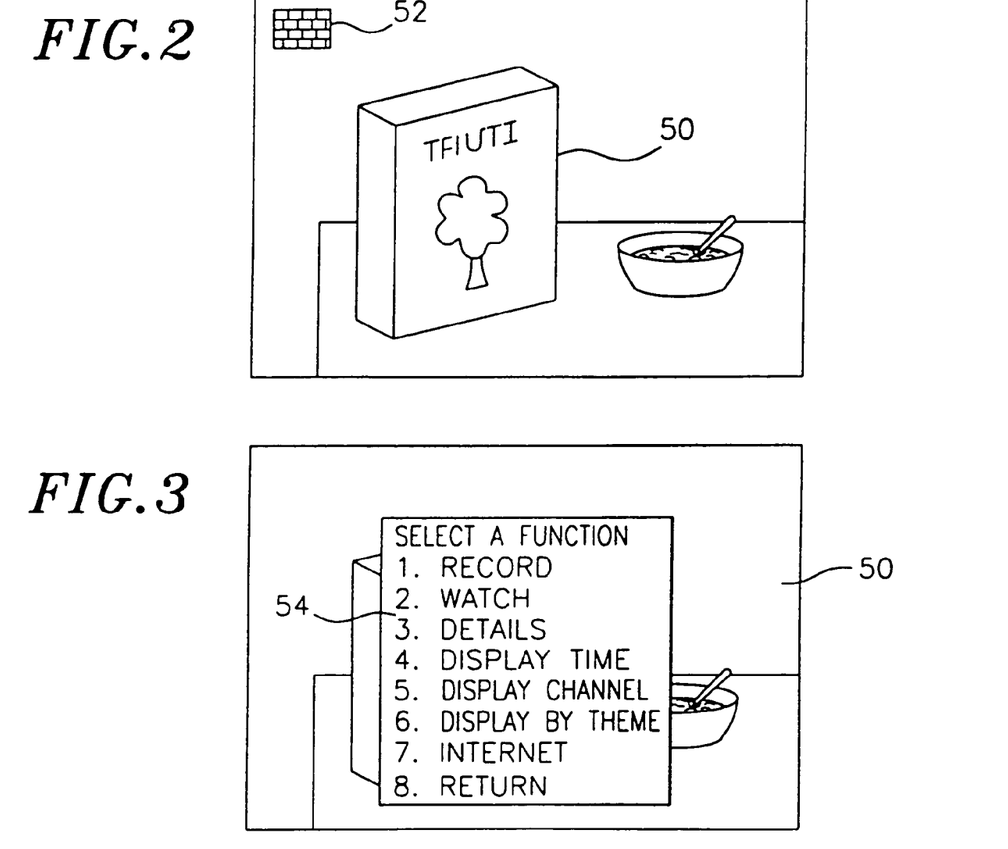
FIG. 2 is a diagram of a display screen illustrating an icon that signals the availability of an EPG function with respect to a future television program.
FIG. 3 is a diagram of a display screen prompting a viewer to select from among a number of EPG functions.

When the viewer issues a command from input device 28, by either pushing a dedicated key or positioning a cursor over icon 52 with arrow keys and clicking an all purpose actuator (enter) key, a box 54 is overlayed over advertisement 50 as illustrated in FIG. 3 to prompt the viewer to invoke an EPG function. A menu of EPG functions is displayed in box 54, namely:

1. record the advertised program when it is telecast at a later time;
2. turn the television on to watch the advertised program when it is telecast at a later time;
3. display details of the advertised program now;
4. display a listing of programs telecast at the same time as the advertised program so the viewer can compare the advertised program with other offerings at the same time;
5. display a listing of programs telecast on the same channel as the advertised program so the viewer can compare the advertised program with other offerings on the same channel;
6. display a listing of programs in the same category or theme as the advertised program so the viewer can determine the availability of programs of the same genre as the advertised program;
7. connect to the Internet to obtain more details about the advertised program than are available through the details function; and
8. return to the television program.

The viewer selects one of the functions for example by moving a cursor to the menu item and then issuing another command to invoke the selected function. For example, the viewer could highlight "3." and click to display details about the advertised program.

If the viewer wishes to extinguish box 50, the viewer selects "8", the return function.

Other functions not listed in FIG. 3 could also be offered. For example, all the times the advertised program is telecast could be displayed on the screen or a news story related to the advertised program could be displayed on the screen, particularly in the case of a sporting event.

With reference to the above PCT application, the EPG information about the television programs is retrievable by time and channel; for example a pre-established time list includes addresses that point to show information packages (SIP) for the television programs. Each television program that has an icon 52 includes in its SIP an address pointing to the schedule information, i.e., day, time, channel, and length, of the advertised program to be telecast at a later time, thereby linking the information of the two television programs. If the "record" or "watch" function is selected, the channel is read from tuner 11 and the time is read from a real time clock in microprocessor 24. From this information, the pointer of the SIP for the current television program is retrieved from the pre-established time list. The retrieved pointer permits microprocessor 24 to find the SIP for the current television program, which contains the address pointing to the schedule information for the advertised program. The schedule information is stored in a memory stack so microprocessor 23 can set tuner 11 to the proper channel and turn on the VCR for unattended future recording or turn on the television for automatic future watching at the appointed time in well known fashion.

The program listing files stored in memory 22 could be organized in any number of other ways so long as the information about the future programs being advertised is "linked" to a current program, i.e., can be retrieved when a current program is being displayed with an EPG function signaling icon. For example, the information about the future programs could be linked to the current programs including advertisements by being part of the same file as the current programs instead of being linked by a pointer.

Figure 4:
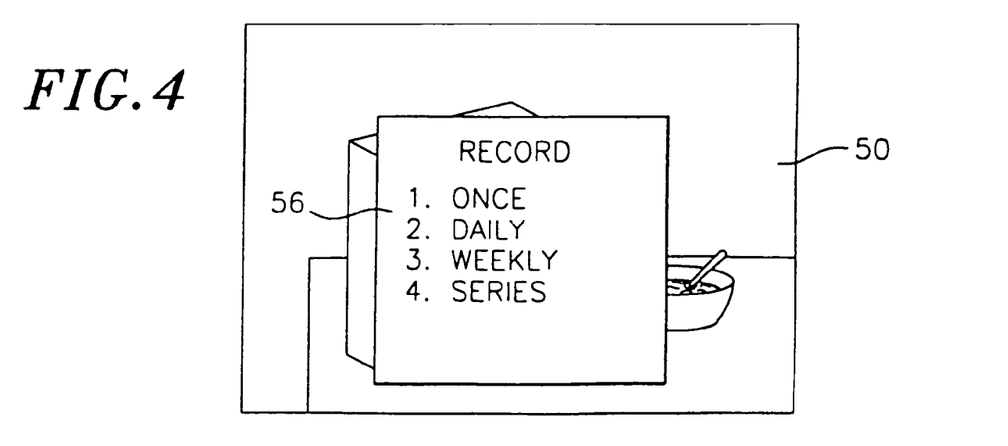
FIG. 4 is a diagram of a display screen prompting a viewer to select among choices for the frequency that a television program is to be recorded.

When the record function is selected, a box 56 is overlaid on advertisement 50 as illustrated in FIG. 4 to prompt the viewer to select a record option. A menu of record options is displayed in box 56. (These record options are also considered to be EPG functions as the term is used herein because they are functions that can normally be performed by an EPG.) The viewer can record the advertised program as follows:

1. once;
2. daily;
3. weekly; or
4. each time program in a series (e.g., the NBA championship games) is telecast.

The viewer selects one of the record options for example by moving a cursor to a menu item, e.g., "3." and clicking to record the advertised program weekly.

As an additional feature, if the series option is selected in FIG. 4, a list of each occurrence of the episodes of the series may be displayed; when a particular episode is selected, a synopsis of the episode would then be displayed. From the synopsis the viewer could select individual episodes of the series to schedule to watch or record.

The menus shown in FIGS. 3 and 4 could be stored in memory 22 along with the EPG data base and overlayed on the image of the advertisement by means of a video switch or other means not represented in FIG. 1.

If the detail function is selected, the detail (program description) information is retrieved from the SIP of the future program being advertised and displayed on the screen of TV 20.

If the time, channel, or theme function is selected, the channel is read from tuner 11 and the time is read from a real time clock in microprocessor 24. From this information, the pointer or pointers of the desired SIP or SIP's are retrieved from the preestablished time list. The retrieved pointer or pointers permit microprocessor 24 to find the desired SIP or SIP's, from which the program listings for the same time, channel, or theme as the advertised program are extracted and fed to video processor 30 for display on the screen of the monitor in the same manner as the data for an ordinary guide described in the referenced PCT application.

Alternatively, if the time or channel function is selected, the time and channel in a grid guide (reference U.S. application Ser. No. 09/120,488) could be displayed so the viewer can see the other programs available on the same channel or at the same time in a grid guide format. In this case, an advertised program or a program telecast at about the same time or on the same channel can be directly scheduled for recording or watching by using the scheduling capability of the guide itself. (See U.S. Pat. No. 5,353,121, the disclosure of which is incorporated herein by reference.)

Figure 5:
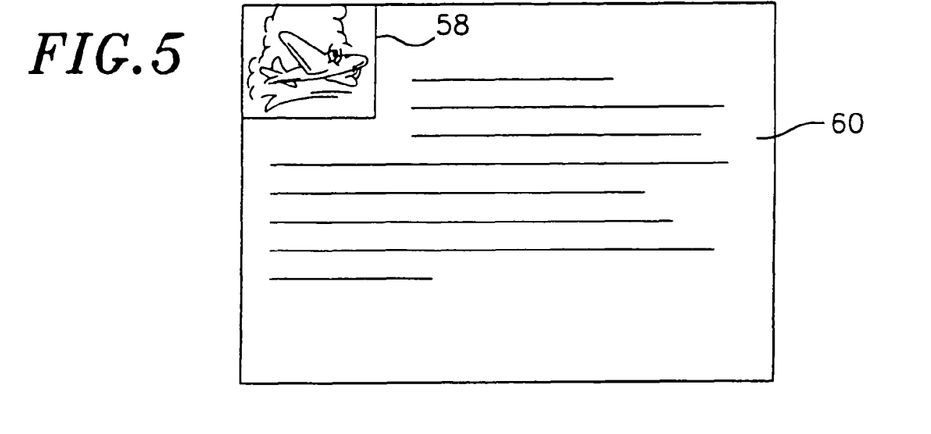
FIG. 5 is a diagram of a display screen illustrating the simultaneous display of a current television program and textual data from an Internet web site.

If the Internet function is selected, the system sets up a connection to a web site where more information is available about the other television program to which the announcement or advertisement relates. The web site address (URL) could be embedded in the VBI of the television signal that carries the announcement, stored at the television receiver in the EPG data base as part of the SIP for the current television program, or retrieved from a central data base via a telephone connection. After the Internet connection is established, as illustrated in FIG. 5, the television program is displayed in a PIP window 58 with the web site information in the background 60, or vis-a-versa. Alternatively, the web site information could replace the television program on the screen. In either case, the viewer can navigate about the web site in the normal fashion to find the desired information.

Instead of appearing during an announcement or advertisement, icon 52 could appear during a television program itself. When the viewer issues the command in response to icon 52, a box 62 is displayed on the screen. An announcement or advertisement of the later telecast program appears in box 62. If the viewer is interested in the later telecast program, the viewer issues another command from input device 28 and box 54 (FIG. 3) is displayed as described above.

Instead of an announcement or advertisement of a later telecast program, the announcement could relate to a current program on another channel. This is particularly applicable to a network that telecasts a plurality of programs concurrently on different channels, as is the case in the HDTV environment. The network can thus promote its other program offerings being telecast at the same time. The viewer can record the other program and continue to watch the program he or she had been watching. Thus, the term "future programs" in this specification is used for ease of comprehension of the inventive principles, but this term also refers to a current program on another channel.

Figure 6:
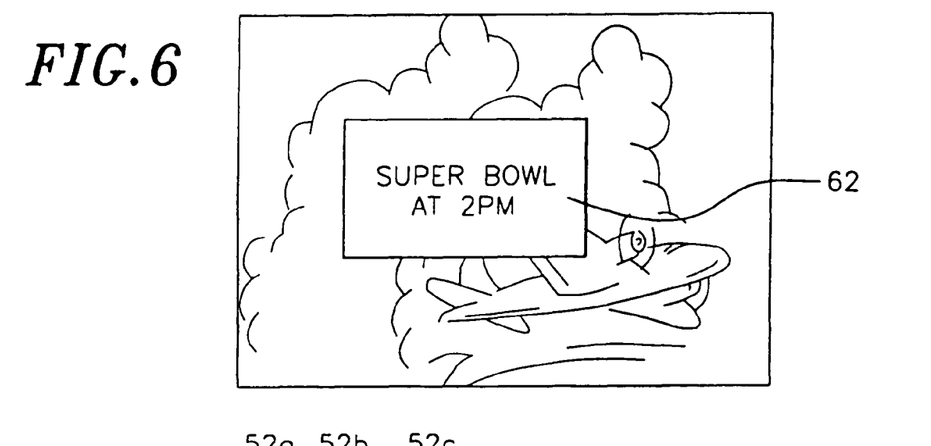
FIG. 6 is a diagram of a display screen illustrating an embodiment in which one or more announcements are stored for later use.

Another alternative is to store one or more announcements of a later telecast program or programs while the television set is turned off. After the television set is turned on, icon 52 is displayed on the screen to alert the viewer that there are stored announcements. As the viewer issues a command from input device 28, the announcements appear on the screen, as illustrated in FIG. 6, in succession. If the viewer is interested in the announced program, the viewer issues another command from input device 28 and box 54 (FIG. 3) is displayed as described above.

Figure 7:
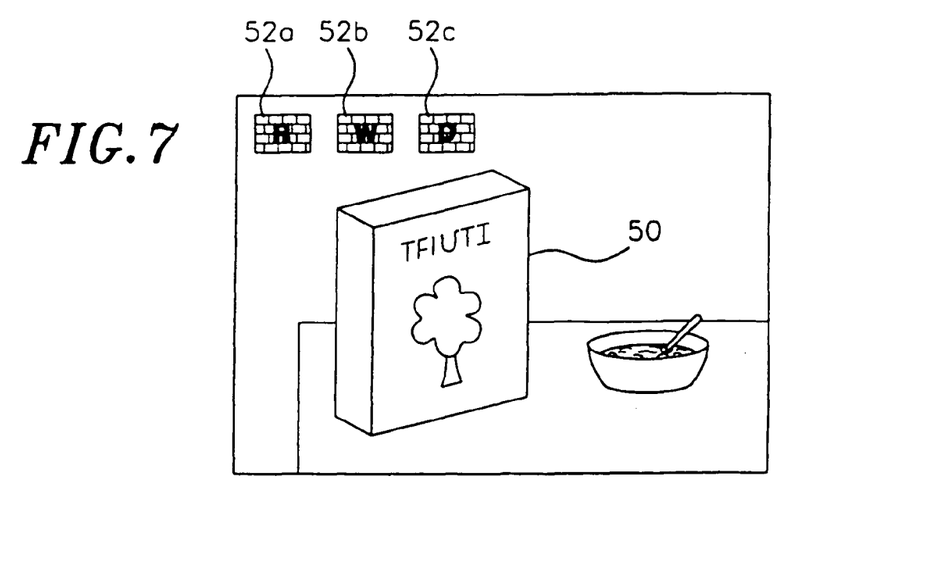
FIG. 7 is a diagram of a display screen in which separate icons are used to signal the availability of different EPG functions.

Instead of a single icon 52 (FIG. 1) that invokes a menu of choices of EPG functions (FIG. 3), a plurality of icons 52a, 52b, and 52c could be displayed as shown in FIG. 7 to bypass the menu of FIG. 3. Each icon is marked with a mnemonic to enable the viewer to distinguish it from the other icons, e.g., "R" stands for "record", "W" stands for "watch", and "D" stands for "details". When the viewer selects one of the icons, e.g., by clicking on the selected icon, the corresponding EPG function is invoked directly.

The described embodiments of the invention are only considered to be preferred and illustrative of the inventive concept; the scope of the invention is not to be restricted to such embodiment. Various and numerous other arrangements may be devised by one skilled in the art without departing from the spirit and scope of this invention. For example, although a visual icon is preferred, an audible signal could be given to alert the viewer to the presence of an announcement or advertisement. Further, if only the record function is available, the menu of FIG. 3 could be bypassed and the menu of FIG. 4 could be displayed directly; alternatively, if only one other EPG function is available, the menu of FIG. 3 could be bypassed in favor of a prompt to confirm the EPG function or the display of some other appropriate prompting menu.

What is claimed is:

1. A method for operating a home entertainment system, the method comprising the steps of:
   storing, in a memory, files containing program schedule information corresponding to a first television program and program schedule information corresponding to a second television program;
   linking, in the memory, the program schedule information corresponding to the first television program to the program schedule information corresponding to the second television program such that the program schedule information corresponding to the second television program can be retrieved from the memory by accessing the program schedule information corresponding to the first television program;
   generating a display of a video of a telecast of the first television program, wherein the video of the telecast includes an announcement or advertisement of the second television program;
   signaling the availability of an electronic program guide function with respect to the second television program during the announcement or advertisement of the second television program;
   receiving a first user command invoking the electronic program guide function with respect to the second television program in response to the signaling;
   retrieving, from the program schedule information corresponding to the first television program, the program schedule information corresponding to the second television program in response to the first user command; and
   executing the electronic program guide function with respect to the second television program by using the information corresponding to the second television program retrieved from the program schedule information corresponding to the first television program, wherein the program schedule information corresponding to the first television program uniquely identifies the first and the second television programs.

2. The method of claim 1, wherein the electronic program guide function is a record function, the program schedule information corresponding to the second television program includes at least one of time, day, channel, and length of the second television program, the retrieving step retrieves at least one of the time, day, channel, and length of the second television program, and the executing step schedules the second television program for recording.

3. The method of claim 1, wherein the electronic program guide function is a watch function, the program schedule information corresponding to the second television program includes at least one of time, day, channel, and length of the second television program, the retrieving step retrieves at least one of the time, day, channel, and length of the second television program, and the executing step schedules the second television program to be generated for display when telecast.

4. The method of claim 1, wherein the electronic program guide function is a details function, the program schedule information corresponding to the second television program includes details corresponding to the second television program, the retrieving step retrieves the details corresponding to the second television program, and the executing step generates a display of the details corresponding to the second television program.

5. The method of claim 1, additionally comprising the step of issuing a viewer command to invoke the retrieving and executing steps.

6. The method of claim 1, wherein the second television program is concurrent with the first television program.

7. The method of claim 1, wherein the second television program is a future program.

8. The method of claim 1, additionally comprising the step of providing a network that concurrently broadcasts a plurality of programs on different channels, respectively, including the first and second television programs.

9. The method of claim 1 additionally comprising the step of concurrently recording the second television program and watching the first television program.

10. The method of claim 5, wherein the step of issuing a viewer command comprises selecting one of a plurality of icons appearing in the announcement, the advertisement, or the first television program, each icon representing one of a plurality of electronic program guide functions.

11. The method of claim 5, wherein the step of issuing a viewer command comprises responding to an icon appearing in the announcement, the advertisement, or the first television program.

12. The method of claim 11, wherein the step of issuing a viewer command additionally comprises generating a display of a second announcement or a second advertisement.

13. The method of claim 12, in which the step of issuing a viewer command additionally comprises responding to the second announcement or the second advertisement to invoke the retrieving and executing steps.

14. The method of claim 1 additionally comprising the step of storing a program announcement while the home entertainment system is turned off.

15. The method of claim 14, additionally comprising the step of turning the home entertainment system on and generating the display of an icon to alert a viewer of the existence of the stored announcement.

16. The method of claim 15, additionally comprising the step of issuing a viewer command to generate a display of the stored announcement.

17. The method of claim 16, wherein the stored announcement includes a plurality of announcements and the plurality of announcements are viewed in succession.

18. The method of claim 16, additionally comprising the step of responding to the generation of a display of the stored announcement to invoke the retrieving and executing steps.

19. The method of claim 1, further comprising generating a display of an overlaid icon on top of the announcement or advertisement generated for display for signaling the availability of the electronic program guide function.

20. The method of claim 19, further comprising generating a display of the overlaid icon immediately before the announcement or advertisement is generated for display.

21. The method of claim 19, further comprising generating a display of the overlaid icon immediately after the announcement or advertisement is generated for display.

22. The method of claim 1, further comprising generating a display of all available time slots at which the second television program is telecast.

23. The method of claim 1, further comprising accessing additional information associated with the second television program from a web page.

24. The method of claim 1, further comprising:
generating a display of information associated with the program schedule information corresponding to the second television program in response to the retrieving step;
receiving a second user command; and
performing the execution step in response to the second user command.

25. A home entertainment system comprising:
a receiver adapted to receive a telecast of a first television program for generation of a display, wherein the telecast includes an announcement or advertisement of a second television program;
a memory storing, in files, program schedule information corresponding to the first television program and program schedule information corresponding to the second television program, wherein the program schedule information corresponding to the first television program is linked in the memory to the program schedule information corresponding to the second television program such that the program schedule information corresponding to the second television program can be retrieved from the memory by accessing the program schedule information corresponding to the first television program; and
a microprocessor configured to:
accept a first user command to invoke an electronic program guide function with respect to the second television program in response to a signal signaling the availability of the electronic program guide function during the announcement or advertisement of the second television program,
retrieve, from the program schedule information corresponding to the first television program, the program schedule information corresponding to the second television program in response to the first user command, and
execute the electronic program guide function with respect to the second television program by using the information corresponding to the second television program retrieved from the program schedule information corresponding to the first television program, wherein the program schedule information corresponding to the first television program uniquely identifies the first and the second television programs.

26. The home entertainment system of claim 25, additionally comprising a signal signaling the availability of an electronic program guide function with respect to the second television program during the announcement or advertisement.

27. The home entertainment system of claim 26, wherein the signal is an icon.

28. The home entertainment system of claim 27, additionally comprising the generation of a display of a list of electronic program guide functions responsive to a viewer command, and an electronic program guide function selector, the microprocessor being configured to execute the selected electronic program guide function.

29. The home entertainment system of claim 26, wherein the signal includes a plurality of icons, each icon representing a different electronic program guide function.

30. The home entertainment system of claim 29, additionally comprising a selector of one of the plurality of icons, the microprocessor being configured to execute the electronic program guide function represented by the selected icon.

31. The home entertainment system of claim 25, wherein the second television program is concurrent with the first television program.

32. The home entertainment system of claim 25, wherein the second television program is a future program.

33. The home entertainment system of claim 25, additionally comprising a network that concurrently broadcasts a plurality of programs on different channels, respectively, the plurality of programs including the first television program and the second television program.

34. The home entertainment system of claim 25, wherein the first television program is watched while the second television program is recording.

35. The home entertainment system of claim 25, wherein a program announcement is stored in the memory while the system is turned off.

36. The home entertainment system of claim 35, additionally comprising the generation for display of an alert icon when the system is turned on, the alert icon signaling the availability of an electronic program guide function with respect to the second television program.

37. The home entertainment system of claim 36, additionally comprising the generation for display of a list of electronic program guide functions responsive to a viewer command, and an electronic program guide function selector, the microprocessor being configured to execute the selected electronic program guide function.

38. The home entertainment system of claim 37, wherein the stored announcement includes a plurality of announcements and the plurality of announcements are viewed in succession.

39. The home entertainment system of claim 25, wherein the microprocessor is further configured to:
generate a display of information associated with the program schedule information corresponding to the second television program in response to the retrieving;
accept a second user command; and
perform the execution of the electronic program guide function in response to the second user command.

40. A method comprising:
storing, in a memory, files containing program schedule information corresponding to a first program and program schedule information corresponding to a second program;
generating a display of a video of the first program, wherein the video includes an announcement or advertisement of the second program;
generating an indication of the availability of an application function with respect to the second program during the announcement or advertisement of the second program;
receiving a user command invoking the application function with respect to the second program responsive to the indication;

retrieving, from the program schedule information corresponding to the first program, the program schedule information corresponding to the second program in response to the user command; and executing the application function with respect to the second program by using the information corresponding to the second program retrieved from the program schedule information corresponding to the first program, wherein the program schedule information corresponding to the first program uniquely identifies the first and the second programs.

\* \* \* \* \*

UNITED STATES PATENT AND TRADEMARK OFFICE
CERTIFICATE OF CORRECTION

PATENT NO.       : 8,689,259 B2                                          Page 1 of 1
APPLICATION NO. : 10/963764
DATED            : April 1, 2014
INVENTOR(S)      : Yuen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this
Thirtieth Day of May, 2017

Michelle K. Lee
*Director of the United States Patent and Trademark Office*